Figure 1:
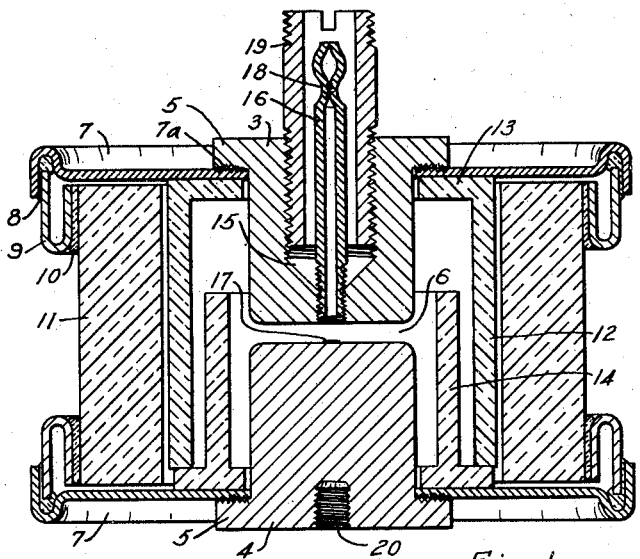

Nov. 18, 1947.                    W. E. BERKEY ET AL                    2,431,226
                                  LOW-PRESSURE GAP-DEVICE
                                    Filed Feb. 11, 1943

INVENTORS
William E. Berkey and
Richard Lamphere.
BY
ATTORNEY

Patented Nov. 18, 1947

2,431,226

UNITED STATES PATENT OFFICE 2,431,226

LOW-PRESSURE GAP DEVICE

William E. Berkey, Forest Hills, Pa., and Richard Lamphere, Springfield, Mass., assignors to Westinghouse Electric Corporation, East Pittsburgh, Pa., a corporation of Pennsylvania Application February 11, 1943, Serial No. 475,512

6 Claims. (Cl. 250—27.5)

Our invention relates to low-pressure gap-devices, and particularly to partially evacuated gap-devices adapted for use in protecting series capacitors against excessive-voltages due to fault-currents in the line in which the capacitors are connected, the gap-devices being connected in shunting relationship to the series capacitors.

It is known that gaps operating in a partial vacuum of the order of eight centimeters of mercury, more or less, have a low breakdown-voltage and a high arc-interrupting voltage, so that they will arc over, when the applied voltage exceeds a certain predetermined amount, and they will automatically interrupt their arcs, usually at the first current-zero, after the applied voltage returns to a value only slightly below the breakdown voltage. It is not generally well known, however, that, when such low-pressure gaps are called upon to pass heavy currents, there results a considerable disintegration of the electrode-material of the gap-electrodes, resulting in a rather strong blast of sputtered vaporized electrode-material which is thrown out with considerable force in a line parallel to the discharge-surfaces of the gap-electrodes.

The principal object of our present invention relates to means for preventing the above-mentioned sputtered material from eventually spreading out in a film covering all of the creepage surfaces of the insulating spacers which hold the gap-electrodes apart. More specifically, our invention aims to provide an insulator-structure which presents creepage-surfaces disposed in such directions that they cannot readily become coated with the sputtered material thrown off from the gap.

With the foregoing and other objects in view, our invention consists in the apparatus, structures, parts, combinations, systems and methods hereinafter described and claimed, and illustrated in the accompanying drawing, Figures 1 and 2 of which are cross-sectional views illustrating two different forms of embodiment of our invention.

Our invention is particularly applicable to a heavy-current, low-pressure gap-device of a type utilizing a gap-structure comprising two spaced massive brass electrodes 3 and 4 which are provided with shoulders 5, at the ends remote from the gap 6, the shoulders 5 being hermetically welded to a thin metal end-member or disk 7 having a perforation for receiving the electrode 3 or 4, as the case may be, the thin end-disks 7 being welded, or otherwise hermetically secured, to the electrode-flange 5, immediately surrounding the perforation in the end-disk 7, as indicated at 7a. The electrodes 3 and 4 are massive, so as to have considerable heat-storage capacity, available for short arcing-periods of the order of 10 cycles, on a sixty-cycle basis, and so as to have considerable heat-conducting capacity for carrying away the heat from the gap 6. The thin metal end-pieces 7 of the gap-devices are made thin for two reasons, both to reduce the rate of flow of heat from the central massive electrode-block 3 or 4, as the case may be, to the periphery of the end-piece, and also to provide a certain amount of flexibility or resilience.

The peripheries of the thin metal end-pieces 7 are solder-sealed, at 8, to other thin metal pieces 9 which are previously solder-sealed, at 10, as by means of a platinized coating known to the art, to a vacuum-tight cylindrical porcelain body-member 11.

Disposed within the cylindrical porcelain body-member 11, and surrounding the two gap-electrode blocks 3 and 4, is an insulating cylindrical spacing-member 12, which may also be of porcelain, and which preferably holds the central portions of the two thin metal end-members or disks 7 somewhat further apart than the length of the cylindrical porcelain body-portion 11, so that the central portions of the thin-metal end-disks are bowed slightly outwardly, thus firmly holding the spacer 12. Preferably, the insulating spacer 12 has an end flange-portion 13 which seats up against the perforated portion of the end disk 7, which is welded to the rear-end flange 5 of the electrode-block 3 or 4, as the case may be, thereby accurately establishing and maintaining the amount of gap-separation at 6, the metal disks 7 having sufficient resilience to press firmly against the insulating spacer 12.

In accordance with our present invention, the insulating spacer 12 is so made that its inner surface will not become entirely covered by the sputtered electrode-material which is thrown off from the gap 6. It is noted that the flat gap-surfaces of the electrodes are disposed transversely with respect to the axis of the cylindrical insulating housing 11, so that the sputtered-metal blast is thrown out in a substantially radial direction.

In the form of invention which is shown in Fig. 1, the sputtered-material-shielding function is performed by a separate insulating cylindrical member 14 which is disposed within the insulating spacer 12 and between the spacer 12 and the gap-electrodes 3 and 4, in spaced relation to both. The two insulating members 12 and 14 may be made of porcelain, as well as the main insulating housing-member 11. In the particular form of invention shown in Fig. 1, the inner porcelain member 14 abuts against the perforated inner end of the lower thin-metal end-disk 7, which is welded to the flange 5 of the lower electrode 4, and the cylindrical portion of this insulating member 14 extends upwardly for a distance less than the total axial space within the container, but sufficient to extend beyond the gap 6, so as to completely shield the gap. Thus, when sputtered electrode-material is thrown off, even though it covers the entire inner cylindrical surface of the inner insulating member 14, and the upper portion of the inner cylindrical surface of the outer spacer-member 12, it will not cover the outer cylindrical portion of the inner member 14, or the bottom portion of the inner cylindrical surface of the outer member 12 to any appreciable extent.

The vacuum-tight space enclosed by the two end-disks 7 and the cylindrical outer housing 11 is partially evacuated by any convenient means, preferably a counterbore hole 15, and a thin-walled pipe connection 16, in one of the electrode-blocks 3.

Before evacuation, and preferably before soldering in the pipe-connection 16, it is usually desirable to insert one or more drops from a dilute solution of a radio-active salt solution, such as radium bromide, through the hole 15 in the upper electrode 3, so that it will dry on the discharge-surface of the lower electrode 4, as indicated at 17.

Preferably, the evacuation is continued to a high degree, and the evacuated space scavenged out with a gas more desirable than air, and then sealed with this gas at the desired pressure. For a gap-separation of about 1/8th of an inch, a gas-pressure of about eight centimeters of mercury is desirable, although it will be understood that we are not limited to this particular gap-length, or to this particular pressure.

For the gas which is used in the partially evacuated space, we prefer hydrogen, helium or argon, at present choosing hydrogen, by preference, because of its low cost. We have found that these three gases do not clean up nearly as fast as air, oxygen, nitrogen, or carbon-dioxide, after many-times repeated heavy-current discharges of one-half cycle duration on a sixty-cycle system. We have not yet discovered why this is so, but we have found that, after a very few heavy-current discharges, if the filling were air, oxygen, nitrogen, or carbon-dioxide, the gaseous filling would largely disappear, dropping the gas-pressure to less than 0.5 millimeter, which renders the gap-device unfit for use. Under the same conditions, the gases, hydrogen, helium and argon, did not change pressure observably, even with the passage of 100 times as many discharges of the same magnitude and duration of current-flow.

After the evacuated space has been filled with the desired gas, and the gaseous pressure reduced to the desired value, the evacuating tube 16 is sealed off, as indicated at 18, and a tubular terminal-connection 19 is screwed into place in surrounding relationship to the thin-walled sealed-off tube 16, so as to protect the latter, while at the same time providing a terminal-connection for the gap-device. A terminal-connection to the other electrode 4 is effected by means of a threaded hole 20 therein.

The essential feature of the means for guarding against sputtered-metal deposits coating the entire insulating creepage-surfaces between the two electrodes, is that at least a portion of this insulating creepage-surface should be disposed at such an angle, with reference to the gap 6, that the sputtered metal will not be able to spread out over that portion of the insulating creepage-surface. In Fig. 1, the protected or uncoated insulating creepage-surface is composed of most of the surface bounding the space between the inner cylindrical guard-member 14 and the outer cylindrical spacer 12, that is, essentially the outer cylindrical surface of the inner member 14, and the lower portion of the inner cylindrical surface of the outer spacer 12. We are not limited, however, to this particular means for providing a protected or uncoated insulating creepage-surface, although the means as shown in Fig. 1 is a desirable means for this purpose.

Figure 2:
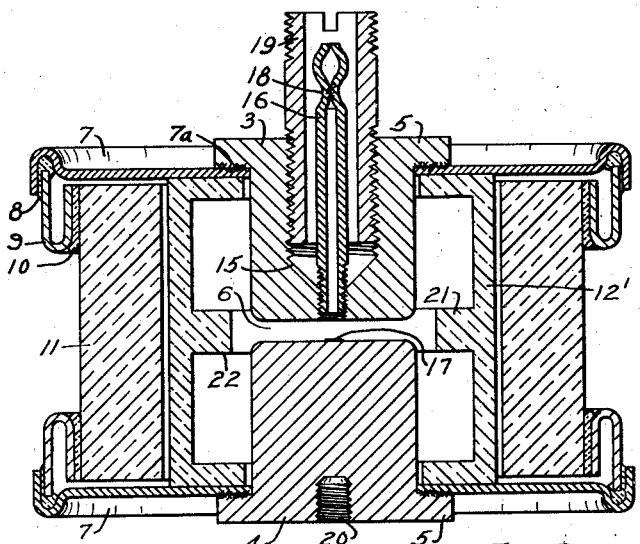

An alternative structure for providing the protected or uncoated insulating creepage-surfaces is shown in Fig. 2, in which the inner cylindrical guard-member 14 of Fig. 1 is omitted, and the insulating cylindrical spacer-member 12' is provided with an annular projection 21, extending inwardly from the central portion of its inner cylindrical surface, in the region surrounding the gap 6, so that the upper and lower surfaces 22 of the annular projection 21 are substantially parallel with the discharge-electrode-surfaces of the gap 6. In this manner, the thrown-off blast of sputtered electrode-material is unable to gather, in any material quantities, on the substantially parallel upper and lower surfaces 22 of the annular projection 21 of the insulating spacer 12', thus providing insulating creepage-surfaces which do not become coated with a deposit of sputtered electrode-material.

In both of the illustrated embodiments of our invention, we have thus provided in insulating creepage-surface structure providing cylindrical and plane insulating creepage-surfaces disposed at a plurality of different angles, for preventing, or greatly retarding, the formation of a complete conductively coated creepage-path from one end-disk to the other.

We claim as our invention:

1. A low-pressure arcing-device for heavy-current discharges, comprising a partially evacuated container having a cylindrical insulating side-wall and metal end-walls having thin-metal peripheral portions sealed to the cylindrical insulating side-wall, a gap-structure within the container in spaced relation to the cylindrical insulating side-wall thereof, said gap-structure comprising two massive metal electrodes having approximately flat gap-surfaces disposed transversely with respect to the axis of the cylindrical insulating side-wall, whereby a gap is provided between said transverse gap-surfaces, and insulating electrode-spacing means for maintaining an accurate gap-length between the flat gap-surfaces of the two electrodes, said insulating electrode-spacing means being separate from and disposed inside of said container in spaced relation to said cylindrical insulating side-wall in an at least partially shielding relation to the latter and containing insulating creepage-surfaces disposed at a plurality of different angles such that sputtered metal thrown off from the gap-structure cannot readily become deposited on all of the insulating creepage-surfaces from electrode to electrode.

2. A low-pressure arcing-device for heavy-current discharges, comprising a partially evacuated container comprising a cylindrical insulating side-wall structure and thin-metal end-disks peripherally sealed to the cylindrical insulating side-wall structure, a massive metal electrode-member extending axially inwardly from the center of each end-disk in spaced relation to the cylindrical insulating side-wall structure, whereby a gap is provided between said two massive metal electrode members, and insulating creepage-surface abutment-means disposed in gap-maintaining position between a rear portion of each of the two electrode-members, back from the gap, and having a plurality of cylindrical and plane insulating creepage-surfaces disposed at a plurality of different angles such that sputtered metal thrown off from the gap cannot readily become deposited on all of the insulating creepage-surfaces from the rear portion of one electrode to the rear portion of the other electrode, said insulating creepage-surface abutment means keeping the central portions of the thin-metal end-disks slightly outwardly.

3. A low-pressure arcing-device for heavy-current discharges, comprising a partially evacuated container comprising a cylindrical insulating side-wall structure and thin-metal end-disks peripherally sealed to the cylindrical insulating side-wall structure, and a centrally disposed gap-structure extending from the central portion of one end-disk to the central portion of the other end-disk in spaced relation to the cylindrical insulating side-wall structure of the contniaer, insulating spacing-means for maintaining the gap-spacing in such manner as to keep the central portions of the thin-metal end-disks bowed slightly outwardly, and a cylindrical insulating creepage-surface means disposed between the gap-structure and the cylindrical insulating side-walls of the container, in spaced relation to each, and having an axial extent less than the total axial space within the container, but sufficient to provide a shield for the sputtered metal thrown off from the gap-structure.

4. A low-pressure arcing-device for heavy-current discharges, comprising a partially evacuated container comprising a cylindrical insulating side-wall structure and thin-metal end-disks peripherally sealed to the cylindrical insulating side-wall structure, a massive metal electrode-member extending axially inwardly from the center of each end-disk in spaced relation to the cylindrical insulating side-wall structure, whereby a gap is provided between said two massive metal electrode-members, cylindrical insulating abutment-means disposed in gap-maintaining position between a rear portion of each of the two electrode-members, back from the gap, in such manner as to keep the central portions of the thin-metal end-disks bowed slightly outwardly, and a cylindrical insulating creepage-surface means disposed between the gap-structure and the cylindrical insulating side-walls of the container, in spaced relation to each, and having an axial extent less than the total axial space within the container, but sufficient to provide a shield for the sputtered metal thrown off from the gap.

5. A low-pressure arcing-device for heavy-current discharges, comprising a partially evacuated container comprising a cylindrical insulating side-wall structure and thin-metal end-disks peripherally sealed to the cylindrical insulating side-wall structure, and a centrally disposed gap-structure extending from the central portion of one end-disk to the central portion of the other end-disk in spaced relation to the cylindrical insulating side-wall structure of the container, insulating spacing-means for maintaining the gap-spacing in such manner as to keep the central portions of the thin-metal end-disks bowed slightly outwardly, and annularly shaped insulating means surrounding the gap in space relation to the latter, within the partially evacuated space, said annularly shaped insulating means having an axial extent greater than the gap-spacing and being disposed opposite to the gap, whereby the flat end-surfaces of the annularly shaped insulating means will not readily become coated with sputtered metal thrown off from the gap.

6. A low-pressure arcing-device for heavy-current discharges, comprising a partially evacuated container comprising a cylindrical insulating side-wall structure and thin-metal end-disks peripherally sealed to the cylindrical insulating side-wall structure, a massive metal electrode-member extending axially inwardly from the center of each end-disk in spaced relation to the cylindrical insulating side-wall structure, whereby a gap is provided between said two massive metal electrode-members, cylindrical insulating abutment-means disposed in gap-maintaining position between a rear portion of each of the two electrode-members, back from the gap, in such manner as to keep the central portions of the thin-metal end-disks bowed slightly outwardly, and annularly shaped insulating means surrounding the gap in spaced relation both to the gap and to the cylindrical insulating abutment-means, within the partially evacuated space, said annularly shaped insulating means having an axial extent greater than the gap-spacing, and being disposed opposite to the gap, whereby the flat end-surfaces of the annularly shaped insulating means will not readily become coated with sputtered metal thrown off from the gap.

WILLIAM E. BERKEY.
RICHARD LAMPHERE.

REFERENCES CITED

The following references are of record in the file of this patent:

UNITED STATES PATENTS

| Number | Name | Date |
| --- | --- | --- |
| 2,365,517 | Berkey | Dec. 19, 1944 |
| 1,933,329 | Hull | Oct. 31, 1933 |
| 1,173,165 | Brach | Feb. 29, 1916 |
| 1,407,061 | Gray | Feb. 21, 1922 |
| 1,995,737 | Everett | Mar. 26, 1935 |

FOREIGN PATENTS

| Number | Country | Date |
| --- | --- | --- |
| 774,124 | France | Sept. 17, 1934 |
| 418,964 | Great Britain | Nov. 2, 1934 |